July 28, 1959
S. D. ROSS
2,897,423
ELECTROSTATIC CAPACITOR
Filed March 14, 1956
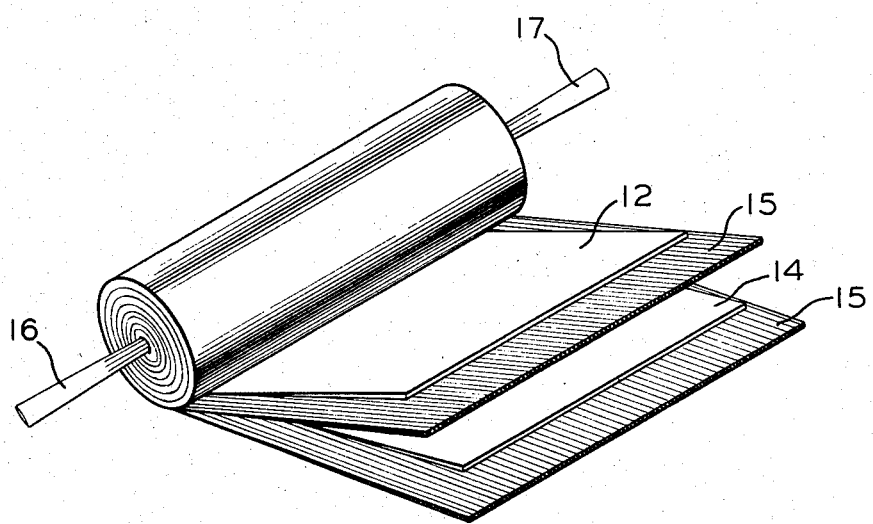
INVENTOR.
SIDNEY D. ROSS
BY *Roland A Dexter*
HIS ATTORNEY

2,897,423

ELECTROSTATIC CAPACITOR

Sidney D. Ross, Williamstown, Mass., assignor to Sprague Electric Company, North Adams, Mass., a corporation of Massachusetts Application March 14, 1956, Serial No. 571,574

1 Claim. (Cl. 317—258)

The present invention relates to new and improved electrostatic capacitors, and more particularly to novel dielectric impregnants suitable for high temperature capacitor applications.

This application is a continuation-in-part of our co-pending application, Serial No. 329,085, filed December 31, 1952, now abandoned.

The use of anthraquinone as a stabilizer for various chlorinated dielectric impregnants such as chlorinated diphenyl or naphthalene has been reported extensively, and has been the subject of commercial applications. However, this material, and even the disclosed methyl derivative of anthraquinone, has not been widely used for hydrocarbon dielectrics because of the limited solubility of these quinones in the hydrocarbon dielectric material.

It is an object of the present invention to overcome the foregoing and related disadvantages of the prior art. A further object is to produce new and useful capacitor dielectric impregnants. A still further object is to produce a stabilized hydrocarbon dielectric impregnant suitable for incorporation in a capacitor for operation at high temperatures without deterioration of the electrical characteristics of the unit. Additional objects will become apparent from the following description and appended drawing which portrays a partially unwound capacitor section in which the stabilized dielectric of the invention is used as the impregnant.

These objects are attained in accordance with the present invention wherein there is produced a capacitor employing a high temperature dielectric composition comprising a predominantly hydrocarbon dielectric containing a quinone substituted with at least one tertiary alkyl group.

In a more restricted sense, the invention is concerned with a high temperature dielectric composition for electrostatic capacitors comprising a hydrocarbon oil containing from about .10% to about 10% of tertiary butyl anthraquinone.

In a still more restricted sense the invention achieves the aforesaid objects by the utilization in a capacitor structure of a high temperature dielectric composition comprising a polyisobutylene type hydrocarbon admixed with from about 0.1% to about 5% of anthraquinone substituted with a least one tertiary butyl group.

I have found that anthraquinone substituted with a tertiary alkyl group is a particularly effective stabilizer for polyisobutylene dielectrics useful over a wide temperature range, and also particularly effective for high operational temperatures, for example 150° C., as failures rapidly occur when no stabilizer is employed. A tertiary alkyl group is defined as one in which the carbon which is attached to the quinone molecule is fully substituted with hydrocarbon groups, and has no direct hydrogen substitutes. While I am not fully aware of the reasons therefore, the stabilizing effect of this particular substituted quinone structure is outstanding and its use in hydrocarbon dielectric compositions generally, and in polyisobutylene type dielectric compositions particularly, leads to exceptionally improved results. The unusual stabilizing characteristics of the tertiary alkyl substituted anthraquinone arises in part by their reaction with the degradation products which occur as a result of the operation of the electrostatic capacitor. With hydrocarbons generally, the primary degradation product resulting from the electrochemical reaction during operation of the capacitor is a free radical, resulting from the abstraction of a hydrogen atom from the dielectric oil. Apparently the substituted anthraquinone taught by this invention is particularly effective in reacting with these free radicals which are formed so as to prevent continued degradation of the dielectric via the incursion of a chain reaction. Within the general class of hydrocarbons, the isobutylene polymer is unique. In the electrochemical reaction of the polyisobutylene dielectric, the immediate production of hydrogen through the dehydrogenation reactions effects in turn further breakdown of the polymer chain, producing isobutylene. The reaction is a continuing one and the particular polymer undergoing electrochemical degradation continues to break down by elimination of isobutylene, thus materially degrading the dielectric. With the presence of an appropriate amount of the tertiary butyl anthraquinone as a stabilizer, the polyisobutylene chain does not undergo this extensive breakdown, but rather the stabilizer prevents not only the initial dehydrogenation, and in the event it does occur, prevents subsequent breaking down of the linear polymer into isobutylene elements.

The novel dielectric compositions obtained in accordance with the teachings of this specification contain from 0.1% to 10% of an anthraquinone derivative possessing one tertiary alkyl group, preferably in the 2 or β position. For applications as a capacitor dielectric impregnant under normal conditions, the stabilizer is used in an amount of from 1% to about 5% of the total weight of the composition. The preferred stabilizer of the invention is β-tertiary butyl anthraquinone, although the di-tertiary butyl anthraquinone is nearly as effective, although it has a slightly lesser degree of solubility in hydrocarbon dielectrics. Other compounds which fall within the scope of the invention, and which can be effectively employed, are alpha-tertiary butyl anthraquinone and β-neopentyl anthraquinone. As a practical limitation, the side chain substituent employed in these compounds should contain no more than 16 carbon atoms.

Polyisobutylene as used herein includes both the homopolymer and copolymers of isobutylene. An exceptional polyisobutylene type dielectric impregnant is that described in the Robinson Patent No. 2,711,498, issued June 21, 1955. These polyisobutylene type impregnants described therein consist generally of a liquid unsaturated linear polymer produced from a mixture of a major amount of isobutylene and a minor amount of diolefins. The diolefin is preferably butadiene 1,3, which can be present in an amount of from 0.5% to about 10% of the total weight of the mixture which is subsequently polymerized. The normal and isomeric alkylenes in addition to isobutylene should have less than 12 carbon atoms and include ethylene, propylene, amylene, higher olefines and mixtures thereof. Suitable representative diolefins include butadiene 1,2; β-methyl-butadiene 1,3; alpha-methyl butadiene 1,3; diisopropenyl; 1,1,3 trimethyl butadiene 1,3; pentadiene 1,4; hexadiene-1,5; octadiene 1,4. The oil thus consists essentially of an unsaturated linear hydrocarbon polymer of a mixture of mono-olefins having less than 12 carbon atoms with about 0.5% to about 10% of diolefines, said linear unsaturated polymer having an iodine number between about 20 and about 70 as determined by Wijs' method and an average molecular weight between about 1200 and about 4200.

Other isobutylene type liquid polymers in addition to the homopolymer having an average molecular weight between 1000 and 7000, and the polymer arising out of the polymerization of the dimer, trimer or higher molecular weight polymer of isobutylene as taught in Bannon, U.S. Patent No. 2,274,031, issued February 24, 1942 includes such copolymers as those of styrene and the oils taught by Harmon U.S. Patent No. 2,151,382, issued March 21, 1939 in which a diolefin may be present in amounts up to 50% by weight of the mixture.

The stabilized polyisobutylene type impregnant is remarkable when used as a capacitor dielectric, although the broad application of my invention is the stabilization of both saturated and unsaturated liquid hydrocarbons generally. Thus included within the broad concept of the invention is mineral oil which for purposes of discussion herein is the common term employed in the electrical components industry to designate any one of a number of substantially pure hydrocarbon oils derived from petroleum. Many of these compositions are not in, and of themselves a pure "fraction" containing only a single compound, but instead, contain a plurality of different molecular ingredients, and may include materials which melt above room temperature.

Reference should now be made to the appended drawing which shows a partly unwound capacitor section in which the stabilized dielectric of the invention is used as the impregnant. This convolutely wound capacitor section consists of two electrode foils 12 and 14 separated by a dielectric spacer material 15. Such a capacitor section preferably consists of aluminum foil separated by a thin calendered kraft paper dielectric spacer material. Flat, flexible, metallic electrically conducting tabs 16 and 17 are wound into the capacitor section so as to electrically contact their respective capacitor electrodes and so as to extend from the opposite ends of the section 10. The section which is impregnated after incorporation into a housing of any of the well-known types for electrostatic capacitors has its electrodes connected to the respective terminals of the housing by means of the tabs 16 and 17. A novel dielectric composition is introduced into the capacitor section by vacuum impregnation methods which are well-known to the art.

The capacitor of the construction illustrated in the appended drawing was impregnated with a stabilized dielectric composition in accordance with the teachings of this invention. The capacitor section consisted of two superimposed aluminum foils 0.25 mil thick and 1.5 inches wide, separated by 2 layers of 0.4 mil thick and 1.75 inches wide calendered kraft paper having a density about 1.0. The capacitor unit was rated at 1.0 mfds. and 600 volts D.C. The impregnant introduced by vacuum means at a temperature of 150° C. consisted of 4% by weight of β-tertiary butyl anthraquinone dissolved in polyisobutylene having an average molecular weight of 2000. These capacitors exhibited much improved life over units impregnated with the non-stabilized polyisobutylene dielectric when both are subjected to extended operational life at 125° C. temperature.

Further examples indicative of the practice of this invention include dielectric systems impregnated into the above capacitor construction in which the respective dielectrics were as follows:

(1) The unsaturated linear oily copolymer of a mixture of isobutylene and 5% by weight of butadiene 1,3, said polymer having an average molecular weight of 1200, a viscosity of 125,000 Saybolt-seconds-units at 100° F. and an iodine number of 40 as determined by Wijs' method was admixed with 1% by weight of β-tertiary butyl anthraquinone which showed an improvement in operational life at elevated temperatures of 125° C. of 2½ to 6 times that of the non-stabilized dielectric.

(2) Mineral oil having a flash point of 507° F. admixed with 3% by weight of β-tertiary butyl anthraquinone.

(3) Liquid polyisobutylene having an average molecular weight of about 3000 admixed with 4% by weight of ditertiary butyl anthraquinone.

(4) Mineral oil having a viscosity of 500 cps. at 25° C. admixed with 2% by weight of ditertiary butyl anthraquinone.

(5) An oily homopolymer of diisobutylene catalyzed by aqueous boron trifluoride, having an iodine number of 50 as determined by Wijs' method, a flash point of 290° F., and an average molecular weight of about 1100 admixed with 8% by weight of β-tertiary butyl anthraquinone.

(6) An oily interpolymer of n-octene-1 and butadiene 1,3 having an average molecular weight of about 1500 and an iodine number of 176 admixed with 5% by weight of β-neopentyl anthraquinone.

The stabilizers employed with the present invention are compounds which, in practically all cases, are presently known. They may be prepared by a variety of conventional organic syntheses, such as, for example, the condensation of the appropriate phthalic anhydride derivative and benzene in the presence of aluminum chloride, followed by the treatment of the resulting intermediate with sulphuric acid. They may also be prepared by the mild oxidation of the appropriate corresponding anthrone derivatives. These in turn, can be prepared by heating o-benzoyl benzoic acid in the presence of zinc dust, or by the reaction of substituted benzene with 1,1,-2,2, tetrabromoethane in the presence of anhydrous aluminum chloride.

*Preparation of β-tert butylanthraquinone.*—Phthalic anhydride (148 grams), t-butyl benzene (131 grams) and purified tetrachloroethane (500 cc.) were mixed in a flask, cooled by means of an ice bath after which anhydrous aluminum chloride (280 grams) was added with stirring. For one hour the reaction flask was kept in an ice bath after which the reaction temperature was raised to between 35° C. and 40° C. and kept there for 4.5 hours. To the flask was added 600 grams of crushed ice followed by concentrated hydrochloric acid (210 cc.) and the mixture stirred for 15 minutes. The tetrachloroethane was removed by steam distillation and the oil solidified by thorough cooling after which the aqueous solution of aluminum chloride was decanted. The crude O-(-P-t-butyl benzoyl)-benzoic acid was treated with a solution of sodium carbonate (74 grams) in water (1.5 liters). The mixture was then agitated and heated by blowing in steam and the solution filtered while hot and acidified with dilute hydrochloric acid. The product acid separated as an oil and after filtering and washing was found to have a melting point of 148–149° C. The acid was suspended in a mixture consisting of fuming sulfuric acid (20% anhydride) (350 cc.) and concentrated sulfuric acid (150 cc.) contained in a flask and thereafter heated in a steam bath for two hours. The solution was cooled and poured onto cracked ice and heated by the passing in of steam until the temperature has risen to about 50° C. The precipitate was filtered, suspended in water (2 liters) and heated and agitated with steam. The material is again collected and digested with water containing a slight excess of ammonium hydroxide. The crystallized material is dissolved in ethyl alcohol and decolorized with charcoal, finally separating out as yellow needles having a melting point of 105–106° C.

*Preparation of di-t-butylanthraquinone.*—Aluminum chloride (60 grams) was added to a cooled solution of t-butylphthalic anhydride (44 grams) prepared by the procedure of R. B. Contractor J. Chem. Soc., 1314 (1949) and t-butylbenzene (30.8 grams) in tetrachloroethane (200 cc.). The mixture was warmed slowly and maintained between 30 and 40° C. for five hours. After cooling, ice (130 grams) and concentrated hydrochloric acid (45 cc.) was added. The solvent was removed by steam distillation. The aqueous layer was decanted and the solid dissolved in 1 liter of water containing sodium carbonate (20 grams) by heating and passing in of steam. The tarry rsidual mixture was removed by filtration and acidified. 50 grams of the resulting product, having a melting point of 175–210° C. was heated for 1½ hours at 100° C. with a mixture of fuming sulfuric acid (150 cc.) and concentrated sulfuric acid (50 cc.). The solution was cooled by pouring onto ice which precipitated the di-tertiary butylanthaquinone. After filtering and washing with water (1 liter) to which ammonium hydroxide had been added to render it alkaline, the product was crystallized from alcohol as yellow plates having a melting point of 150–158° C. The product was a mixture of the two isomers of di-t-butylanthraquinone.

The stabilizers of the invention, when used with the saturated and unsaturated hydrocarbon dielectrics set forth, commonly known in the art, have been found to remarkably extend the operating lifetime of capacitors impregnated with the stabilized systems over similar capacitors impregnated with the primary dielectric not containing the stabilizer compound. Further, the tertiary alkyl substituted anthaquinones do not reduce the resistivity of the dielectric impregnant upon their addition to such a low value that they are no longer useful for present day applications in electronic circuits. Another advantage is that the stabilizers of the invention are soluble to a high level in the dielectrics set forth above, which lack of solubility has previously prevented what were thought otherwise to be effective stabilizers from being used.

The dielectric compositions of the invention may also be used for transformers, circuit breakers and numerous other devices in which the insulating material is in an electrical field. The electrical requirements for capacitor applications are more stringent than for other applications and the impregnant must be of a higher resistance, lower power factor, and less susceptible to degradation occasioned by electrochemical reactions.

As many apparently widely different embodiments of this invention may be made without departing from the scope thereof, it is to be understood that the invention is not limited to the specific embodiments hereof except as defined in the appended claim.

I claim:

An electrostatic capacitor capable of operation at 150° C. for extended periods comprising a plurality of electrodes separated by a porous dielectric spacer, a high temperature dielectric impregnant composition impregnated in said spacer consisting of a linear copolymer of a mixture of isobutylene and diolefin in the range of from .5 to 10% by weight of said copolymer, said copolymer having average molecular weight of from 1200 to about 1400 and an iodine number of from 20 to about 70 and high resistivity and a low power factor, and anthraquinone substituted with at least one t-butyl group admixed in said copolymer in the range of from 0.1% to about 10% by weight of said copolymer.

References Cited in the file of this patent

UNITED STATES PATENTS

| 2,711,498 | Robinson | June 21, 1955 |
| 2,719,182 | Ross et al. | Sept. 27, 1955 |

OTHER REFERENCES

"Stabilization of Dielectrics," by Sauer, Ind. and Eng. Chem., vol. 44, No. 1, January 1952, pp. 135–140.

Basseches et al.: "Gassing of Liquid Dielectrics under Electrical Stress," Ind. and Eng. Chem., September 1955, pp. 1782–1794.